United States Patent [19]

Valyocsik

[11] Patent Number: 4,902,406

[45] Date of Patent: Feb. 20, 1990

[54] SYNTHESIS OF ZEOLITE ZSM-22

[75] Inventor: Ernest W. Valyocsik, Yardley, Pa.

[73] Assignee: Mobil Oil Corporation, New York, N.Y.

[21] Appl. No.: 629,743

[22] Filed: Jul. 10, 1984

Related U.S. Application Data

[63] Continuation of Ser. No. 373,452, Apr. 30, 1982, abandoned.

[51] Int. Cl.⁴ .................. C10G 11/05; C01B 33/28
[52] U.S. Cl. .................... 208/118; 208/46; 423/328
[58] Field of Search .............. 423/328, 329, 330; 502/77; 208/46, 106, 113, 118

[56] References Cited

U.S. PATENT DOCUMENTS

| | | | |
|---|---|---|---|
| Re. 29,948 | 3/1979 | Dwyer et al. | 208/110 |
| 3,709,979 | 1/1973 | Chu | 423/328 |
| 3,832,449 | 3/1971 | Rosinski et al. | 423/328 |
| 4,016,245 | 4/1977 | Plank et al. | 423/328 |
| 4,046,859 | 9/1977 | Plank et al. | 423/328 |
| 4,061,724 | 12/1977 | Crose et al. | 423/335 |
| 4,073,865 | 2/1978 | Flanigen et al. | 423/339 |
| 4,104,294 | 8/1978 | Grose et al. | 260/448 |
| 4,139,600 | 3/1979 | Rollman et al. | 423/329 |
| 4,146,584 | 3/1979 | Rollman | 423/328 |
| 4,358,397 | 11/1982 | Chu | 252/455 Z |
| 4,423,021 | 12/1983 | Rollmann et al. | 423/326 |

FOREIGN PATENT DOCUMENTS 0077624  10/1982  European Pat. Off.
2077709  12/1981  United Kingdom ............ 423/328 T

*Primary Examiner*—John Doll
*Assistant Examiner*—R. Bruce Breneman
*Attorney, Agent, or Firm*—Alexander J. McKillop; Charles J. Speciale; Edward F. Kenehan, Jr.

[57] ABSTRACT

A process for preparing a new zeolite, designated ZSM-22, is disclosed and claimed. The process comprises preparing a reaction mixture comprised of sources of an alkali or alkaline earth metal, alumina, silica, alkane diamine and water, and having the following composition, in terms of mole ratios of oxides:

| | | |
|---|---|---|
| $SiO_2/Al_2O_3$ | = | 20 to $\infty$ |
| $H_2O/SiO_2$ | = | 10 to 100 |
| $OH^-/SiO_2$ | = | 0 to 0.3 |
| $M^+/SiO_2$ | = | 0 to 2.0 |
| $RN/SiO_2$ | = | 0.01 to 2.0 | wherein RN is a $C_2$–$C_{12}$ alkane diamine of the formula $H_2N$—$(CH_2)_n$—$NH_2$, wherein n=2 to 10, and M is an alkali or alkaline earth metal, e.g., Na, K, Cs, Li, Ca or Sr, and maintaining the reaction mixture at crystallization conditions until crystals of the ZSM-22 zeolite are formed.

35 Claims, No Drawings

SYNTHESIS OF ZEOLITE ZSM-22

This is a continuation of copending application Ser. No. 373,452, filed Apr. 30, 1982, now abandoned.

BACKGROUND OF THE INVENTION

1. Field of the Invention

This invention relates to a novel synthetic porous crystalline material designated as Zeolite ZSM-22, to a method for its preparation and to its use in catalytic conversion of organic compounds.

2. Description of Related Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as having a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,076,842), ZSM-35 (U.S. Pat. No. 4,016,245), and ZSM-38 (U.S. Pat. No. 4,046,859).

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5, up to infinity. U.S. Pat. No. 3,941,871, now Re. 29,948, the entire contents of which are incorporated herein by reference, discloses a porous crystalline silicate zeolite made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294, the entire contents of all three patents being incorporated herein by reference, describe crystalline silicates or organosilicates of varying alumina and metal content.

SUMMARY OF THE INVENTION

The present invention is directed to a process for manufacturing a novel highly siliceous porous crystalline material related to the zeolite ZSM-5. The crystalline material produced in the process of this invention has been designated the zeolite ZSM-22 and it has a characteristic X-ray diffraction pattern, as set forth in Table 1, discussed below.

The ZSM-22 highly siliceous zeolite can be suitably prepared from a reaction mixture containing a source of silica, an alkane diamine, an alkali metal oxide or an alkaline earth metal oxide, e.g., sodium, potassium, cesium, calcium or strontium, water, and alumina, and having a composition, in terms of mole ratios of oxides, falling within the following ratios:

| Reactants | Broad | Preferred |
|---|---|---|
| $SiO_2/Al_2O_3$ = | 20 to ∞ | 30 to 1000 |
| $H_2O/SiO_2$ = | 10 to 100 | 20 to 60 |
| $OH^-/SiO_2$ = | 0 to 0.3 | 0.1 to 0.2 |
| $M^+/SiO_2$ = | 0 to 2.0 | 0.1 to 1.0 |
| $RN/SiO_2$ = | 0.01 to 2.0 | 0.05 to 1.0 | wherein RN is a $C_2$–$C_{12}$ alkane diamine of the formula $H_2N$—$(CH_2)_n$—$NH_2$ (abbreviated $C_nDN$), n=2 to 12, and preferably is 5 to 8, and M is an alkali metal or an alkaline earth metal and maintaining the mixture at crystallization temperature until crystals of the ZSM-22 zeolite are formed. Thereafter, the crystals are separated from the liquid by any conventional means, washed and recovered. The ZSM-22 zeolite can be used in aromatics alkylation reactions (e.g., toluene alkylation by methanol and ethylene), toluene disproportionation, selective cracking of a meta/para-cymene mixture, and conversion of various oxygenates to gasoline-grade hydrocarbons.

DETAILED DESCRIPTION OF THE INVENTION

Crystallization can be carried out at either static or stirred conditions in a reactor vessel, e.g., a polypropylene jar, teflon lined or stainless steel autoclaves, at 80° C. (176° F.) to about 210° C. (410° F.) for about 6 hours to 150 days. Thereafter, the crystals are separated from the liquid and recovered. The composition can be prepared utilizing materials which supply the appropriate oxide. Such materials include aluminates, alumina, silicates, sodium silicate, silica hydrosol, silica gel, silicic acid, sodium, potassium or cesium hydroxide, and an alkane diamine. Suitable diamines are, e.g., ethanediamine, propanediamine, butanediamine, pentanediamine, hexanediamine, heptanediamine, octanediamine, nonanediamine, decanediamine, undecanediamine, duodecanediamine. The reaction mixture can be prepared either batchwise or continuously. Crystal size and crystallization time of the new crystalline material will vary with the nature of the reaction mixture employed and the crystallization conditions.

As set forth above, the ZSM-22 zeolite can be prepared at a relatively wide range of $SiO_2/Al_2O_3$ ratios of about 20 to about infinity ($\infty$). However, it has been found that larger alkali metal cations, e.g., $K^+$ and $Cs^+$, are preferably used at the $SiO_2Al_2O_3$ ratios of about 20 to about 90 to obtain ZSM-22 crystals substantially free of impurities or other zeolites. The potassium ($K^+$) cation is preferred at such low $SiO_2/Al_2O_3$ ratios because cesium (Cs) appears to decrease the reaction rate. At the $SiO_2/Al_2O_3$ ratios of 90 or above, smaller cations, e.g., sodium $N^+$) cations, are preferably used to produce substantially 100% crystalline ZSM-22.

The highly siliceous ZSM-22 zeolite comprises crystalline, three-dimensional continuous framework silicon-containing structures or crystals which result when all the oxygen atoms in the tetrahedra are mutually shared between tetrahedral atoms of silicon or aluminum, and which can exist with a network of mostly $SiO_2$, i.e., exclusive of any intracrystalline cations. Similar crystals form building blocks of materials, such as quartz, cristobalite and a long list of zeolite structures such as ZSM-5, ZSM-11, ZSM-12, ZSM-23, ZSM-35, ZSM-38, ZSM-48 (described in European patent application Ser. No. 80,300,463 published Sept. 3, 1980 as Publication Number 0,015,132, the entire content of which is incorporated herein by reference), mordenite and perhaps even faujasite. Not all zeolite structures are known to exist at this time in predominantly $SiO_2$—containing compositions—so the above class of materials does not presently include some zeolites, such as zeolite A.

The ZSM-22 zeolite also may contain a relatively minor amount of $Al_2O_3$ and therefore can produce a product with a $SiO_2$ to $Al_2O_3$ ratio of about 20 to about $\infty$. In the as-synthesized form, the ZSM-22 has a calculated composition, in terms of moles of oxides, after dehydration, per 100 moles of silica, as follows:

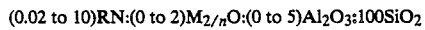

$(0.02 \text{ to } 10)RN:(0 \text{ to } 2)M_{2/n}O:(0 \text{ to } 5)Al_2O_3:100SiO_2$ wherein RN is a $C_2$-$C_{12}$ alkane diamine and M is an alkali metal or an alkaline earth metal having a valence n, e.g., Na, K, Cs, Li, Ca or Sr.

ZSM-22 can further be identified by its sorptive characteristics and its X-ray diffraction pattern. The original cations of the as-synthesized ZSM-22 may be replaced at least in part by other ions using conventional ion exchange techniques. It may be necessary to precalcine the ZSM-22 zeolite crystals prior to ion exchange. The replacing ions introduced to replace the original alkali, alkaline earth and/or organic cations may be any that are desired so long as they can pass through the channels within the zeolite crystals. Desired replacing ions are those of hydrogen, rare earth metals, metals of Groups IB, IIA, IIB, IIIA, IIIB, IVA, IVB, VIB and VIII of the Periodic Table. Among the metals, those particularly preferred are rare earth metals, manganese, zinc and those of Group VIII of the Periodic Table.

ZSM-22 zeolite described herein has a definite X-ray diffraction pattern, set forth below in Table I, which distinguishes it from other crystalline materials.

TABLE I

| Most Significant Lines of ZSM-22 | |
|---|---|
| Interplanar d-spacings (Å) | Relative Intensity |
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

These values were determined by standard techniques. The radiation was the K-alpha doublet of copper and a diffractometer equipped with a scintillation counter and an associated computer were used. The peak heights, I, and the positions as a function of 2 theta, where theta is the Bragg angle, were determined using algorithms on the computer associated with the spectrometer. From these, the relative intensities, $100 \text{ I}/I_o$, where $I_o$ is the intensity of the strongest line or peak, and d (obs.) the interplanar spacing in angstroms (Å), corresponding to the recorded lines, were determined. In Table I, the relative intensities are given in terms of the symbols vs=very strong, s=strong, m=medium, w=weak, etc. It should be understood that this X-ray diffraction pattern is characteristic of all the species of ZSM-22 zeolite compositions. Ion exchange of the alkali or alkaline earth metal cations with other ions results in a zeolite which reveals substantially the same X-ray diffraction pattern as that of Table I with some minor shifts in interplanar spacing and variations in relative intensity. Other minor variations can occur, depending on the silica to alumina ratio of the particular sample, as well as its degree of thermal treatment.

The ZSM-22 zeolite freely sorbs normal hexane and has a pore dimension greater than about 4 Angstroms. In addition, the structure of the zeolite must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous hydrocarbon conversions, although puckered structures exist such as TMA offretite which is a known effective zeolite. Also, such twelve-membered structures can be conceived that may be operative due to pore blockage or other causes.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. (288° C.) and 950° F. (510° C.) to give an overall conversion between 10% and 60%. The mixture of hydrocarbons is passed at a 1 liquid hourly space velocity (LHSV), i.e., 1 volume of liquid hydrocarbon per volume of zeolite per hour, over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10}(\text{fraction of 3-methylpentane remaining})}$$

The constraint index approximates the ratio of the cracking rate constants for the two hydrocarbons. The ZSM-22 zeolite has a constraint index of about 2.6 at 800° F. (427° C.). Constraint Index (CI) values for some other typical zeolites are:

| Zeolite | C.I. |
| --- | --- |
| ZSM-5 | 8.3 |
| ZSM-11 | 8.7 |
| ZSM-12 | 2 |
| ZSM-23 | 9.1 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H—Zeolon | 0.4 |
| REY | 0.4 |
| Amorphous Silica-Alumina (non-zeolite) | 0.6 |
| Erionite | 38 |

It is to be realized that the above constraint index values typically characterize the specified zeolites but that these are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite, may affect the constraint index. It will accordingly be understood by those skilled in the art that the constraint index, as utilized herein, while affording a highly useful means for characterizing the zeolites of interest is an approximation, taking into consideration the manner of its determination, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1000° F. and a liquid hourly space velocity of less than one, such as 0.1 or less, can be employed in order to achieve a minimum total conversion of about 10%.

Preliminary data indicates that the ZSM-22 zeolite has an orthorhombic noncentral structure consisting substantially of 5 and 6-member rings which form a substantially unidirectional 10-ring channel system. Four member rings appear to be completely absent from the structure, which may explain, at least to some extent, the relatively high thermal stability of ZSM-22. (A sample of ZSM-22 was found to be thermally stable after heating at 550° C. in air for 20 hours, and substantially steam stable, after the treatment at 920° F.—about 493° C.—for 5 hours in 1 atm saturated steam.) The ZSM-22 crystalline structure appears to be similar to zeolites of the ZSM-5 family, particularly ZSM-5, ZSM-11, ZSM-23, and ZSM-35. Accordingly, its performance characteristic may be similar to those of the aforementioned zeolites of the ZSM-5 family. Preliminary data, however, does not completely support this hypothesis. For example, the $\alpha$ activity, set forth in Table II, of ZSM-22 samples is less than that predicted for the ZSM-5 zeolite of equivalent $SiO_2/Al_2O_3$ ratios. Without wishing to be bound by any theory of operability, it is possible that trace amounts of the potassium cation ($K^+$) strategically located within the unidimensional channels may account for the reduced activity of the zeolite. Extractions of ZSM-22 samples with hydrochloric acid (HCl) to reduce the $K^+$ level in the zeolite may be effective in improving $\alpha$ activity.

TABLE II

Comparison of Activities for ZSM-22 an ZSM-5

| | | $\alpha$-value | |
| --- | --- | --- | --- |
| Form | Wt % K Present | Observed | (expected) |
| As-synthesized | 2.3 | — | (—) |
| TMA-exchanged[a] | 0.41 | 35 | $(\alpha = 130)^c$ |
| NH$_4$-exchanged[b] | 0.04 | 61 | $(\alpha = 130)^c$ |

[a]98° C., stirred 6 hrs. in 0.5 N tetramethyl ammonium bromide (TMABr).
[b]98° C., stirred 6 hrs. in 1.0 N NH$_4$NO$_3$.
[c]$\alpha$-value expected for ZSM-5 of equivalent $SiO_2/Al_2O_3$ ratio.

The alpha-test ($\alpha$-test) is an indication of the relative catalytic cracking activity of the catalyst compared to a standard catalyst. The value of $\alpha$ is the relative rate constant (rate of n-hexane conversion per unit volume of catalyst per unit time). It is based on the activity of highly active silica-alumina cracking catalyst taken as $\alpha = 1$.

The $\alpha$-test is further described in a letter to the editor, entitled "Superactive Crystalline Alumino-Silicate Hydrocarbon Cracking Catalysts", by P. B. Weisz and J. N. Miale, *Journal of Catalysis*, Vol. 4, pp. 527–529 (August 1965) and in U.S. Pat. No. 3,354,078, the entire contents of both of which are incorporated herein by reference.

The sorption of hydrocarbons by ZSM-22 has also been surveyed and the results are summarized in Table III. Sorption capacities for n-hexane (normal hexane), cyclohexane, and water are about 4% by weight, or about one third that of ZSM-5. Without wishing to be bound by any theory of operability, it is thought that the reduced sorption capacity may be due to the unidimensional channel system of ZSM-22, but residual $K^+$ within the channels may also contribute to the relatively low sorption capacities. Cyclohexane and o-xylene sorption is relatively slow, making it difficult to determine equilibrium capacities.

TABLE III

ZSM-22 Sorption Data

| Sample | Form | Sorptions (wt %)[a] | | | | |
|---|---|---|---|---|---|---|
| | | n-hexane | 3-methyl-pentane | Cyclo-hexane[c] | $H_2O$ | o-xylene[b] |
| 1 | Hydrogen (H) | 3.9 | — | 2.8 | — | — |
| 2 | H | 4.2 | 3.9 | 1.1 | — | ~2 |
| 3 | H | 4.1 | — | 3.3 | 4.7 | — |
| 4 | as-synthesized | 3.4 | — | — | — | — |

[a]Hydrocarbons: pressure = 20 mm, temperature = 25° C.; water-pressure = 12 mm, temperature = 25° C.
[b]pressure = 3.7 mm, temperature = 120° C.
[c]slow tailing sorption, nonequilibrium values.

Preliminary results also indicate that ZSM-22 is para-selective in its catalytic reactions. The ZSM-22 zeolite, as synthesized, tends to crystallize as agglomerates of elongated crystals having the size of about 0.5 to about 2.0 microns ($\mu$). Ballmilling fractures these crystals into smaller size crystallites (about 0.1 $\mu$) without significant loss of crystallinity. The zeolite can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

While synthetic ZSM-22 zeolites may be used in a wide variety of hydrocarbon conversion reactions, they are notably useful in the processes of polymerization, aromatization and cracking. Other hydrocarbon conversion processes for which ZSM-22 may be utilized in one or more of its active forms include, for example, hydrocracking and converting light aliphatics to aromatics. A process for converting light aliphatics to aromatics over a ZSM-5 type zeolite is disclosed in U.S. Pat. No. 3,760,024, the entire contents of which are incorporated herein by reference.

Employing a catalytically active form of the ZSM-22 catalyst for polymerization of olefins containing liquid or gaseous charge stocks, such charge stocks can be polymerized at temperatures between 550° F. and 850° F. (about 290° C. and 450° C.) at an hourly space velocity of between 0.5 and 50 WHSV (weight hourly space velocity) and a pressure of between 0.1 and 800 psig. In employing the catalyst of the present invention for aromatization of gaseous or liquid charge stocks which may be olefinic or paraffinic, with or without aromatics present, such stocks can be aromatized at temperatures of between 800° F. and 1200° F. (about 430° C. and 650° C.), pressures of 1 to 10 atmospheres and space velocities of between 0.1 and 10 weight hourly space velocity (WHSV).

Synthetic ZSM-22 zeolites can be used either in the organic nitrogen-containing and alkali metal-containing form, the alkali metal form and hydrogen form or another univalent or multivalent cationic form. The as-synthesized zeolite may be conveniently converted into the hydrogen, the univalent or multivalent cationic forms by base exchanging the zeolite to remove the sodium cations by such ions as hydrogen (from acids), ammonium, alkylammonium and arylammonium including $RNH_3$, $R_3NH^+$, $R_2NH_2^+$ and $R_4N^+$ where R is alkyl or aryl, provided that steric hindrance does not prevent the cations from entering the cage and cavity structure of the ZSM-22 type crystalline zeolite. The hydrogen form of the zeolite, useful in such hydrocarbon conversion processes as isomerization of poly-substituted alkyl aromatics and disproportionation of alkyl aromatics, is prepared, for example, by base exchanging the sodium form with, e.g., ammonium chloride or hydroxide, whereby the ammonium ion is substituted for the sodium ion. The composition is then calcined, at a temperature of, e.g., 1000° F. (about 540° C.), causing evolution of ammonia and retention of the hydrogen proton in the composition. Other replacing cations include cations of the metals of the Periodic Table, particularly metals other than sodium, most preferably metals of Group IIA, e.g., zinc, and Groups IIIA, IVA, IB, IIB, IIIB, IVB, VIB and Group VIII of the Periodic Table, and rare earth metals and manganese.

Ion exchange of the zeolite can be accomplished conventionally, e.g., by packing the zeolite into a series of vertical fixed bed columns and successively passing through the beds a water solution of a soluble salt of the cation to be introduced into the zeolite, and then changing the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in the as synthesized ZSM-22 zeolite. One such commercially available rare earth chloride solution contains chlorides of a rare earth mixture having the relative composition: cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as Sm O) 3% by weight, gadolinium (as $Gd_2O_3$) 2% by weight, and other rare earth oxides 0.8% by weight. Didymium chloride, which can also be used as an exchanging solution, is also a mixture of rare earth chlorides, but having a lower cerium content. It consists of the following rare earth metals determined as oxides: lanthanum 45-65% by weight, cerium 1-2% by weight, praseodymium 9-10% by weight, neodymium 32-33% by weight, samarium 5-7% by weight, gadolinium 3-4% by weight, yttrium 0.4% by weight, and other rare earth metals 1-2% by weight. It is to be understood that other mixtures of rare earth metals are also applicable for the preparation of the novel compositions of this invention, although lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedures described in U.S. Pat. Nos. 3,140,251, 3,140,252 and 3,140,253, the entire contents of which are incorporated herein by reference.

The ZSM-22 crystal can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is desired. Such component can be exchanged into the composition, impregnated therein or physically intimately admixed therewith. Such component can be impregnated in or onto the zeolite, for example, in the case of platinum, by treating the zeolite with a solution containing a platinum metal-containing ion. Thus, suitable platinum compounds include chloro-platinic acid, platinous chloride and various compounds containing the platinum tetrammine-platinum complex. Combinations of the aforementioned metals and methods for their introduction can also be used.

Synthetic ZSM-22 zeolite, when employed either as an absorbent or as a catalyst in a hydrocarbon conversion process, should be at least partially dehydrated. This can be accomplished by heating the zeolite to a temperature in the range of about 200° C. to about 600° C. in an inert atmosphere, such as air or nitrogen for about 1 to about 48 hours. Simple dehydration of the crystal can also be performed at lower temperatures, such as room temperature, merely by placing the ZSM-22 zeolite type crystal in a vacuum, but a longer time is required to obtain a sufficient degree of dehydration.

In the case of many catalysts, it is desired to incorporate the new crystal with another material resistant to the temperatures and other conditions employed in organic conversion processes. Such materials include active and inactive materials and synthetic or naturally occurring zeolites as well as inorganic materials, such as clays, silica and/or metal oxides. The clays, silica and/or metal oxides may be either naturally occurring or in the form of gelatinous precipitates or gels including mixtures of silica and metal oxides. The use of such additional active material in conjunction with the new ZSM-22 crystal, i.e., combined therewith, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Such materials, e.g., clays or oxides, function as binders for the catalyst. It is desirable to provide a catalyst having good crush strength because in commercial use it is desirable to prevent the catalyst from breaking down into powder-like materials. These clay binders are normally employed for the purpose of improving the crush strength of the catalyst and they can be employed to perform the same function in combination with the ZSM-22 zeolite.

Naturally occurring clays which can be composited with the new zeolite include the montmorillonite and kaolin family, which families include the subbentonites, and the kaolins commonly known as Dixie, McNamee-Georgia and Florida clays or others in which the main mineral constituent is halloysite, kaolinite, dickite, nacrite, or anauxite. Such clays can be used in the new state as originally mined or initially subjected to calcination, acid treatment or chemical modification. Binders useful for compositing with the present crystal also include inorganic oxides, notably alumina.

In addition to the foregoing materials, the ZSM-22 zeolite can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the crystal content ranging from about 1 to about 90 percent by weight.

In order to more fully illustrate the nature of the invention and the manner of practicing same, the following examples are presented.

In the examples which follow, and elsewhere in the specification, whenever adsorption data are set forth for comparison of sorptive capacities for water, cyclohexane and n-hexane, they were determined as follows:

A weighed sample of the calcined zeolite was contacted with the desired pure adsorbate vapor in an adsorption chamber, evacuated to <1 mm pressure and contacted with 12 mm Hg of water vapor or 20 mm Hg of n-hexane or cyclohexane vapor, pressures less than the vapor-liquid equilibrium pressure of the respective adsorbate at room temperature. The pressure was kept constant (within about +0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the pressures to the aforementioned control levels. Sorption was complete when the pressure change was not sufficient to activate the manostat. The increase in weight was calculated as the adsorption capacity of the sample in g/100 g of calcined adsorbent.

EXAMPLE 1

$Al_2(SO_4)_3 \cdot 16H_2O$, the alumina source, potassium hydroxide, water and octanediamine, $H_2N-(CH_2)_8-NH_2$, the organic promoter, RN, were mixed together and transferred to a stainless steel autoclave. Silica sol (30% $SiO_2$), the silica source, was added with stirring to the mixture in the autoclave. The reaction mixture composition, in mole ratios, was:

| | | |
|---|---|---|
| $SiO_2/Al_2O_3$ | = | 90 |
| $H_2O/SiO_2$ | = | 40 |
| $OH^-/SiO_2$ | = | 0.2 |
| $K^+/SiO_2$ | = | 0.3 |
| $RN/SiO_2$ | = | 0.3 |

The reaction mixture was maintained at 160° C. with stirring (400 rpm) for 3 days when crystallization was completed. The solids were separated from any unreacted components by filtration and then water washed, followed by drying at 110° C.

Adsorption capacities of the washed, dried and calcined product were:

| | |
|---|---|
| water | 2.98% wt |
| cyclohexane | 0.96% wt |
| n-hexane | 2.66% wt |

The product had molar $SiO_2/Al_2O_3=80$, and $\alpha$-value of 55.

X-ray analysis of the product revealed that the crystals have the following X-ray diffraction pattern:

TABLE IV

| X-RAY DATA OF CALCINED ZSM-22 OF EXAMPLE 1 | | | |
|---|---|---|---|
| Line | 2Theta | D(A) | I/IMAX |
| 1 | 8.11 | 10.90 | 66 |
| 2 | 10.11 | 8.75 | 17 |
| 3 | 12.74 | 6.95 | 20 |
| 4 | 16.30 | 5.44 | 11 |
| 5 | 19.36 | 4.58 | 11 |

TABLE IV-continued

X-RAY DATA OF CALCINED ZSM-22 OF EXAMPLE 1

| Line | 2Theta | D(A) | I/IMAX |
|------|--------|------|--------|
| 6 | 20.30 | 4.37 | 100 |
| 7 | 21.78 | 4.08 | 4* |
| 8 | 24.16 | 3.68 | 81 |
| 9 | 24.58 | 3.62 | 57 |
| 10 | 25.68 | 3.47 | 36 |
| 11 | 26.63 | 3.35 | 7 |
| 12 | 26.97 | 3.31 | 7 |
| 13 | 27.66 | 3.22 | 2 |
| 14 | 29.97 | 2.981 | 2 |
| 15 | 30.38 | 2.942 | 4 |
| 16 | 30.74 | 2.908 | 3 |
| 17 | 31.91 | 2.804 | 1 |
| 18 | 32.10 | 2.789 | 2 |
| 19 | 32.69 | 2.739 | 3 |
| 20 | 32.98 | 2.716 | 3 |
| 21 | 35.57 | 2.524 | 19 |
| 22 | 36.58 | 2.457 | 3 |
| 23 | 36.84 | 2.440 | 10 |
| 24 | 37.37 | 2.406 | 2 |
| 25 | 37.61 | 2.391 | 3 |
| 26 | 37.98 | 2.369 | 6 |
| 27 | 39.40 | 2.287 | 1 |
| 28 | 40.21 | 2.243 | 1 |
| 29 | 43.73 | 2.070 | 4 |
| 30 | 44.40 | 2.040 | 4 |
| 31 | 44.81 | 2.023 | 2 |
| 32 | 45.26 | 2.003 | 3 |
| 33 | 47.31 | 1.921 | 1 |
| 34 | 47.72 | 1.906 | 3 |
| 35 | 48.56 | 1.875 | 7 |
| 36 | 49.29 | 1.849 | 2 |
| 37 | 49.72 | 1.834 | 1 |
| 38 | 51.05 | 1.789 | 3 |
| 39 | 51.96 | 1.760 | 1 |
| 40 | 52.79 | 1.734 | 1 |
| 41 | 53.85 | 1.702 | 1 |
| 42 | 55.03 | 1.669 | 1 |
| 43 | 55.63 | 1.652 | 2 |
| 44 | 56.43 | 1.631 | 2 |
| 45 | 57.36 | 1.606 | 5 |
| 46 | 58.61 | 1.575 | 1 |

*Intensity enhanced by cristobalite

EXAMPLES 2-21

In order to determine optimum crystallization parameters for ZSM-22, a series of experiments was conducted using various mixture compositions. The crystallization of Examples 2 through 21 was conducted at 160° C. in a stirred (400 rpm) stainless steel autoclave with silica sol (30% $SiO_2$), as the silica source, and $Al_2(SO_4)_3 \cdot 16OH_2O$ or sodium aluminate ($NaAlO_2$) as the alumina source. The organic promoters employed were pentanediamine, hexanediamine, heptanediamine or octanediamine as identified in Table V below. Results of these experiments are summarized in Table V. The products were identified by X-ray diffraction analysis.

TABLE V

| Example | Mixture Composition (Mole Ratios) | | | | | Crystallization Days | PRODUCT |
|---------|-----------|-----------|-----------|-----------|--------|------|---------|
|  | $SiO_2/Al_2O_3$ | $H_2O/SiO_2$ | $OH^-/SiO_2$ | $M^+/SiO_2$ | $RN/SiO_2$ | | |
| 2 | ∞ | 40 | 0 | 0.6 | 0.3 | 1 | 60% ZSM-22 + 20% ZSM-48 |
| 3 | ∞ | 20 | 0 | 0.3 | 0.3 | 1 | 10% ZSM-22 + 90% ZSM-48 |
| 4 | 500 | 40 | 0.2 | 0.3 | 0.3 | 2 | 20% ZSM-22 + 40% ZSM-48 |
| 5 | 200 | 40 | 0 | 0.6 | 0.3 | 2 | 100% ZSM-22 |
| 6 | 200 | 40 | 0 | 0.6 | 0.3 | 2 | 100% ZSM-22 |
| 7 | 180 | 40 | 0.1 | 0.14 | 0.3 | 3 | 100% ZSM-22 |
| 8 | 90 | 40 | 0.2 | 0.3 | 0.3 | 2 | 100% ZSM-22 |
| 9 | 90 | 40 | 0.2 | 0.3 | 0.3 | 3 | 100% ZSM-22 |
| 10 | 90 | 40 | 0.2 | 0.3 | 0.3 | 4 | 100% ZSM-22 |
| 11 | 90 | 40 | 0.2 | 0.3 | 0.3 | 1 | 100% ZSM-22 |
| 12 | 90 | 40 | 0.2 | 0.3 | 0.6 | 2 | 100% ZSM-22 |
| 13 | 90 | 40 | 0.2 | 0.3 | 0.15 | 4 | ZSM-22 + trace cristobalite |
| 14 | 90 | 40 | 0.1 | 0.2 | 0.3 | 4 | ZSM-22 + trace cristobalite |
| 15 | 90 | 40 | 0 | 0.3 | 0.3 | 2 | 100% ZSM-22 |
| 16 | 90 | 40 | 0 | 0.3 | 0.3 | 2 | 60% ZSM-22 |
| 17 | 90 | 40 | 0 | 0.3 | 0.3 | 2 | 60% ZSM-22 |
| 18 | 90 | 40 | 0 | 0.6 | 0.3 | 3 | 60% ZSM-22 |
| 19 | 60 | 40 | 0.2 | 0.33 | 0.3 | 2 | 100% ZSM-22 |
| 20 | 60 | 40 | 0.2 | 0.33 | 0.3 | 4 | 100% ZSM-22 |
| 21 | 60 | 40 | 0.2 | 0.33 | 0.3 | 4 | 100% ZSM-22 |

$M^+$ was sodium in Examples 2–6, cesium in Example 18 and potassium in the remaining examples.
RN was derived from pentanediamine in Example 16, hexanediamine in Examples 7, 10–14, 20, and 21, heptanediamine in Example 17, and octanediamine in the remaining examples.

The X-ray diffraction pattern of the as-synthesized ZSM-22 zeolites of Examples 20 and 21 is set forth below in Tables VI and VII, respectively.

The data for Tables VI, VII, and VIII was obtained in the same manner as the data of Table I. Accordingly, the abbreviations and symbols of Tables VI and VII have the same meaning as set forth above in connection with the discussion of Table I.

TABLE VI

X-RAY DATA FOR THE AS-SYNTHESIZED ZSM-22 OF EXAMPLE 20

| 2 × Theta | d | $I/I_o$ |
|-----------|-----|---------|
| 8.17 | 10.82 | 32 |
| 8.90 | 9.94 | 1* |
| 10.17 | 8.70 | 8 |
| 12.76 | 6.94 | 11 |
| 16.35 | 5.42 | 4 |
| 16.58 | 5.35 | 8 |
| 18.40 | 4.82 | 1+ |
| 19.45 | 4.56 | 11 |
| 19.80 | 4.48 | 3 |
| 20.40 | 4.35 | 100 |
| 21.85 | 4.07 | 1+ |
| 22.18 | 4.01 | 1 |
| 23.10 | 3.85 | 3* |
| 23.30 | 3.82 | 3* |
| 24.27 | 3.67 | 77 |
| 24.65 | 3.61 | 70 |
| 25.72 | 3.46 | 43 |
| 26.38 | 3.38 | 4 |
| 26.64 | 3.35 | 5 |
| 27.06 | 3.30 | 8 |
| 27.68 | 3.22 | 1 |
| 30.05 | 2.97 | 3 |
| 30.40 | 2.94 | 4 |
| 30.83 | 2.90 | 4 |
| 31.89 | 2.81 | 1 |

TABLE VI-continued
X-RAY DATA FOR THE AS-SYNTHESIZED ZSM-22 OF EXAMPLE 20

| 2 × Theta | d | I/I₀ |
|---|---|---|
| 32.18 | 2.78 | 2 |
| 32.68 | 2.74 | 2 |
| 32.98 | 2.72 | 4 |
| 35.63 | 2.52 | 19 |
| 36.61 | 2.455 | 3 |
| 36.90 | 2.436 | 11 |
| 37.40 | 2.404 | 3 |
| 37.63 | 2.390 | 2 |
| 38.05 | 2.365 | 7 |
| 39.45 | 2.284 | 1 |
| 40.23 | 2.242 | 1 |
| 43.45 | 2.083 | 1 |
| 43.73 | 2.070 | 4 |
| 44.44 | 2.039 | 3 |
| 44.90 | 2.019 | 2 |
| 45.37 | 1.999 | 3 |
| 47.40 | 1.918 | 1 |
| 47.77 | 1.905 | 4 |
| 48.48 | 1.878 | 9 |
| 49.33 | 1.847 | 2 |
| 49.65 | 1.836 | 2 |

*Trace ZSM-5.
+Trace cristobalite.

TABLE VII
X-RAY DATA FOR THE AS-SYNTHESIZED ZSM-22 OF EXAMPLE 21

| 2 × Theta | d | I/I₀ |
|---|---|---|
| 8.13 | 10.88 | 29 |
| 10.14 | 8.72 | 8 |
| 12.73 | 6.95 | 11 |
| 16.30 | 5.44 | 4 |
| 16.53 | 5.36 | 7 |
| 18.30 | 4.85 | 1+ |
| 19.35 | 4.59 | 10 |
| 19.76 | 4.49 | 3 |
| 20.31 | 4.37 | 100 |
| 21.75 | 4.09 | 1+ |
| 22.12 | 4.02 | 1 |
| 23.05 | 3.86 | 2 |
| 23.30 | 3.82 | 2 |
| 24.16 | 3.68 | 75 |
| 24.55 | 3.63 | 63 |
| 25.60 | 3.48 | 37 |
| 26.32 | 3.39 | 3 |
| 26.58 | 3.35 | 6 |
| 26.98 | 3.30 | 7 |
| 27.61 | 3.23 | 1 |
| 29.95 | 2.98 | 3 |
| 30.33 | 2.95 | 3 |
| 30.75 | 2.91 | 3 |
| 31.80 | 2.81 | 1 |
| 32.08 | 2.79 | 2 |
| 32.58 | 2.75 | 2 |
| 32.92 | 2.72 | 3 |
| 35.53 | 2.53 | 19 |
| 36.53 | 2.460 | 3 |
| 36.80 | 2.442 | 10 |
| 37.20 | 2.417 | 3 |
| 37.58 | 2.393 | 2 |
| 37.94 | 2.371 | 6 |
| 39.33 | 2.291 | 1 |
| 40.13 | 2.247 | 1 |
| 43.35 | 2.087 | 1 |
| 43.63 | 2.074 | 3 |
| 44.30 | 2.045 | 3 |
| 44.73 | 2.026 | 2 |
| 45.26 | 2.004 | 3 |
| 47.30 | 1.922 | 1 |
| 47.68 | 1.907 | 3 |
| 48.41 | 1.880 | 8 |
| 49.22 | 1.851 | 2 |
| 49.53 | 1.840 | 2 |

+Trace cristobalite.

EXAMPLES 22-24

A solution of 28.6 parts colloidal silica (30 wt. % $SiO_2$) and 29.8 parts water was prepared. An acid solution of 1 part aluminum sulfate (17.2 wt. % $Al_2O_3$), 2.3 parts potassium hydroxide and 52.3 parts water was also made. These two solutions were combined and mixed for 15 minutes. Five parts of 1,6-hexanediamine were added to the solution and the entire mixture was stirred. This solution was put into a stirred autoclave and heated to 320° F. This temperature was maintained for 72 hours.

The resultant zeolite was then filtered and washed on a Buchner Funnel and then dried overnight at 250° F.

This preparation was prepared three consecutive times and the analyses are as follows:

| Example | 22 | 23 | 24 |
|---|---|---|---|
| Zeolite | ZSM-22 | ZSM-22 | ZSM-22 |
| % Crystallinity | 120% | 140% | 135% |
| $SiO_2/Al_2O_3$ Ratio | 64 | 61 | 64 |
| Na, wt. % | 0.13 | 0.10 | 0.13 |
| K, wt. % | 0.21 | 0.21 | 0.22 |
| N, ppm | 660 | 1170 | 670 |

The x-ray diffraction pattern of the zeolite of Example 23 is set forth below in Table VIII.

TABLE VIII
X-RAY DATA FOR THE AS-SYNTHESIZED ZSM-22 OF EXAMPLE 23

| Line | 2 Theta | D(A) | I/IMAX |
|---|---|---|---|
| 1 | 8.10 | 10.91 | 35 |
| 2 | 8.79 | 10.07 | 2* |
| 3 | 10.11 | 8.75 | 7 |
| 4 | 12.71 | 6.97 | 11 |
| 5 | 16.23 | 5.46 | 4 |
| 6 | 16.47 | 5.38 | 8 |
| 7 | 19.35 | 4.59 | 11 |
| 8 | 20.30 | 4.37 | 100 |
| 9 | 21.75 | 4.09 | 2 |
| 10 | 23.05 | 3.86 | 8* |
| 11 | 23.11 | 3.85 | 6* |
| 12 | 24.16 | 3.68 | 74 |
| 13 | 24.53 | 3.63 | 63 |
| 14 | 25.60 | 3.48 | 38 |
| 15 | 26.38 | 3.38 | 5 |
| 16 | 26.58 | 3.35 | 7 |
| 17 | 26.99 | 3.30 | 7 |
| 18 | 27.68 | 3.22 | 1 |
| 19 | 29.97 | 2.982 | 3 |
| 20 | 30.34 | 2.946 | 3 |
| 21 | 30.76 | 2.906 | 2 |
| 22 | 32.01 | 2.796 | 1 |
| 23 | 32.63 | 2.744 | 2 |
| 24 | 32.92 | 2.721 | 3 |
| 25 | 35.55 | 2.525 | 19 |
| 26 | 36.92 | 2.441 | 9 |
| 27 | 37.30 | 2.411 | 2 |
| 28 | 37.96 | 2.370 | 6 |
| 29 | 39.30 | 2.293 | 1 |
| 30 | 40.12 | 2.248 | 1 |
| 31 | 43.67 | 2.073 | 3 |
| 32 | 44.36 | 2.042 | 3 |
| 33 | 44.79 | 2.024 | 3 |
| 34 | 45.27 | 2.003 | 3 |
| 35 | 47.72 | 1.906 | 4 |
| 36 | 48.41 | 1.880 | 8 |
| 37 | 49.30 | 1.848 | 2 |
| 38 | 51.08 | 1.788 | 3 |
| 39 | 51.90 | 1.762 | 1 |
| 40 | 52.76 | 1.735 | 1 |
| 41 | 54.91 | 1.672 | 1 |
| 42 | 55.62 | 1.652 | 2 |
| 43 | 56.32 | 1.634 | 2 |
| 44 | 57.34 | 1.607 | 5 |

TABLE VIII-continued

X-RAY DATA FOR THE AS-SYNTHESIZED ZSM-22 OF EXAMPLE 23

| Line | 2 Theta | D(A) | I/IMAX |
|------|---------|------|--------|
| 45 | 58.71 | 1.573 | 1 |

*Intensity enhanced by ZSM-5.

EXAMPLE 25

Catalyst Preparation from Zeolites of Examples 22-24

Samples of equal weight of zeolites of Examples 22-24 were combined and then mixed with alumina and water. This mixture was extruded into 1/16" pellets and dried. The extruded material contained 65 parts ZSM-22 per 35 parts alumina.

The dried extrudate was calcined for three hours at 538° C. in flowing nitrogen. After cooling, the extrudate was twice contacted with an ammonium nitrate exchange solution (about 0.08 lb. $NH_4NO_3$/lb of extrudate) for one hour at room temperature.

The extrudate was then dried and calcined in air at 538° C. for six hours. The product analysis is as follows:
Na, wt. %: 0.03
N, ppm: 17
α (activity at 1000° F. relative to silica-alumina)=57.

EXAMPLES 26-28

The catalyst of Example 25 was subjected to a feedstream of 50/50 by weight methanol and water at 30 psig pressure at 1 WHSV (methanol) to produce ethylene. The results and conditions of the three Examples are summarized below.

| Example | 26 | 27 | 28 |
|---------|-----|-----|-----|
| Temperature, °F. | 672 | 700 | 725 |
| Methanol Conversion, % by wt. | 47.5 | 60.2 | 68.8 |
| Ethylene Selectivity, % by wt. | 21.3 | 17.9 | 13.7 |

EXAMPLE 29

Heavy Stock Catalytic Dewaxing 17.6 grams of the catalyst of Example 25 was mixed with 88 grams of furfural raffinate in a pressure reactor. The reactants were allowed to react for 130 minutes at 500 psig. The results of the runs, for a product having boiling point (BP) of 650° F. or above, are summarized below.

| Run | Reaction Temp.°F. | Pour Point °F. | VI(Viscosity Index) |
|-----|-------------------|----------------|---------------------|
| A | 600 | 90 | 99.9 |
| B | 550 | 65 | 106.8 |

The properties of the feedstock are set forth below. The objective of this example was the reduction of the amount of high molecular weight paraffins (waxes) so that the resultant hydrocarbon stock can be processed into more desireable products. As the above data indicates, the pour point of the feedstock was reduced considerably, indicating that ZSM-22 is an effective dewaxing zeolite.

| Feed of Example 29 | |
|---------------------|---|
| Gravity, API | 29.2 |
| Pour Point, °F. | 0.8805 |
| KV @ 100° C., Centistokes | 9.260 |
| KV @ 130° C., Centistokes | 38.72 |
| Carbon Residue, wt. % (RCR) | 0.11 |
| Sulfur, wt. % | 0.74 |
| Nitrogen, wt. % | 42 |
| Refractive Index @ 70° C. | 1.46513 |
| Aniline Point, °F. | 233 |

| Vacuum Distillation, % by Wt. | BP, °F. |
|-------------------------------|---------|
| — | 769 |
| 5 | 825 |
| 10 | 845 |
| 30 | 878 |
| 50 | 897 |
| 70 | 911 |
| 90 | 931 |
| 95 | 937 |

It will be apparent to those skilled in the art that the specific embodiments discussed above can be successfully repeated with ingredients equivalent to those generically or specifically set fourth above and under variable process conditions.

From the foregoing specification one skilled in the art can readily ascertain the essential features of this invention and without departing from the spirit and scope thereof can adopt it to various diverse applications.

What is claimed is:

1. A process for preparing a siliceous porous crystalline ZSM-22 zeolite material having the X-ray diffraction pattern of Table 1, which material is substantially 100% ZSM-22, which process comprises preparing a reaction mixture capable of forming said crystalline ZSM-22, said reaction mixture being comprised of sources of an alkali or alkaline earth metal, alumina, silica, RN and water, and having the following composition, in terms of moles ratios of oxides:

| $SiO_2/Al_2O_3$ | = | 20 to infinity |
| $H_2O/SiO_2$ | = | 10 to 100 |
| $OH^-/SiO_2$ | = | 0 to 0.3 |
| $M^+/SiO_2$ | = | 0 to 2.0 |
| $RN/SiO_2$ | = | 0.01 to 2.0 | wherein RN is a $C_2$ to $C_{12}$ alkane diamine of the formula $H_2N$—$(CH_2)_n$—$NH_2$, where n=2 to 12, and M is an alkali or alkaline earth metal, and maintaining the mixture at sufficient crystallization conditions until crystals of said zeolite are formed.

2. A process according to claim 1 wherein the mixture has the following composition:

| $SiO_2/Al_2O_3$ | = | 30 to 1000 |
| $H_2O/SiO_2$ | = | 20 to 60 |
| $OH^-/SiO_2$ | = | 0.1 to 0.2 |
| $M^+/SiO_2$ | = | 0.1 to 1.0 |
| $RN/SiO_2$ | = | 0.05 to 1.0 | wherein RN and M are the same as in claim 1.

3. A process according to claim 2 wherein RN is pentanediamine, hexanediamine, heptanediamine or octanediamine.

4. A process according to claim 3 wherein M is selected from the group consisting of sodium, potassium or cesium.

5. A process according to claim 4 wherein M is sodium.

6. A process according to claim 1 wherein the mole ratio $SiO_2/Al_2O_3$ 20 to 90.

7. A process according to claim 6 wherein RN is pentanediamine, hexanediamine, heptanediamine or octanediamine.

8. A process according to claim 7 wherein M is selected from the group consisting of sodium, potassium or cesium.

9. A process according to claim 8 wherein M is potassium or cesium.

10. A process according to claim 9 wherein M is potassium.

11. A process according to claim 2 wherein the mole ratio $SiO_2/Al_2O_3 = 60$ to 200.

12. A process according to claim 11 wherein RN is pentanediamine, hexanediamine, heptanediamine or octanediamine.

13. A process according to claim 12 wherein M is selected from the group consisting of sodium, potassium or cesium.

14. A process according to claim 13 wherein M is sodium.

15. A process according to claim 5 wherein the mole ratio $SiO_2/Al_2O_3$ is at least 90.

16. A process of claim 14 wherein the mole ratio $SiO_2/Al_2O_3$ is at least 90.

17. A process according to claim 1, wherein $SiO_2/Al_2O_3$ is 200, $H_2O/SiO_2$ is 40, $OH^-/SiO_2$ is 0, $M^+/SiO_2$ is 0.6 and $RN/SiO_2$ is 0.3, where M is sodium and RN is octanediamine.

18. A process according to claim 1, wherein said crystallization conditions are maintained for a time period of four days or less.

19. A catalytic process employing a catalyst comprising a siliceous porous crystalline ZSM-22 zeolite material having a composition, expressed in terms of moles of anhydrous oxides, as follows:

$$(y)M_{2/n}: (z)L_2O_3: 100SiO_2$$

wherein M is an alkali or alkaline earth metal having a valence n, $y = 0$ to 2.0, $z = 0$ to 5, and L is aluminum (Al), and having an X-ray diffraction pattern of Table D as follows:

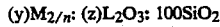

| d(Å) | I |
|---|---|
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

20. A hydrocarbon conversion process using as catalyst a composition comprising a siliceous porous crystalline ZSM-22 zeolite material having a composition, expressed in terms of moles of anhydrous oxides, as follows:

$$(y)M_{2/n}: (z)L_2O_3: 100SiO_2$$

wherein M is an alkali or alkaline earth metal having a valence n, $y = 0$ to 2.0, $z = 0$ to 5, and L is aluminum (Al), and having an X-ray diffraction pattern of Table D as follows:

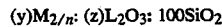

| d(Å) | I |
|---|---|
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

21. A process for cracking hydrocarbons using as a catalyst a composition comprising a siliceous porous crystalline ZSM-22 zeolite material having a composition, expressed in terms of moles of anhydrous oxides, as follows:

$$(y)M_{2/n}: (z)L_2O_3: 100SiO_2$$

wherein M is an alkali or alkaline earth metal having a valence n, $y = 0$ to 2.0, $z = 0$ to 5, and L is aluminum (Al), and having an X-ray diffraction pattern of Table D as follows:

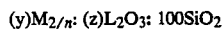

| d(Å) | I |
|---|---|
| 10.9 ± 0.2 | M-VS |
| 8.7 ± 0.16 | W |
| 6.94 ± 0.10 | W-M |
| 5.40 ± 0.08 | W |
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

22. A siliceous porous crystalline ZSM-22 zeolite material having a calculated composition, in terms of moles of oxides, after dehydration, per 100 moles of silica, as follows:

$$(0.02\ to\ 10)RN: (0\ to\ 2)M_{2/n}O: (0\ to\ 5)Al_2O_3: 100SiO_2$$

wherein RN is a $C_2-C_{12}$ alkane diamine having the formula $$H_2N-(CH_2)_n-NH_2,$$

where $n = 2$ to 12, and M is alkali metal or an alkaline earth metal having a valence n, and having the X-ray diffraction pattern of the following Table:

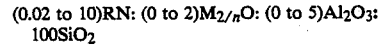

| d(Å) | I |
|---|---|
| 10.9 ± 0.2 | M-VS |
| 8.7 ± 0.16 | W |
| 6.94 ± 0.10 | W-M |
| 5.40 ± 0.08 | W |

-continued

| d(Å) | (D) I |
|---|---|
| 4.58 ± 0.07 | W |
| 4.36 ± 0.07 | VS |
| 3.68 ± 0.05 | VS |
| 3.62 ± 0.05 | S-VS |
| 3.47 ± 0.04 | M-S |
| 3.30 ± 0.04 | W |
| 2.74 ± 0.02 | W |
| 2.52 ± 0.02 | W |

23. A process for preparing a siliceous porous crystalline ZSM-22 zeolite material, which process comprises the steps of:
(i) preparing a reaction mixture capable of forming said crystalline ZSM-22, said reaction mixture being comprised of sources of an alkali or alkaline earth metal, alumina, silica, RN and water, and having the following composition, in terms of mole ratios of oxides:

| | | |
|---|---|---|
| $SiO_2/Al_2O_3$ | = | 20 to infinity |
| $H_2O/SiO_2$ | = | 10 to 100 |
| $OH^-/SiO_2$ | = | 0 to 0.3 |
| $M^+/SiO_2$ | = | 0 to 2.0 |
| $RN/SiO_2$ | = | 0.01 to 2.0 | wherein RN is a $C_5$ to $C_8$ alkane diamine of the formula $H_2N-(CH_2)_n-NH_2$, where n=5 to 8, and M is an alkali or alkaline earth metal;
(ii) maintaining said mixture of step (i) at sufficient crystallization conditions until a crystalline material is formed; and
(iii) recovering a solid material from the mixture of step (ii), said solid material being at least 60% ZSM-22, said ZSM-22 having the X-ray diffraction pattern of Table 1.

24. A process according to claim 23, wherein said alkane diamine is hexanediamine or octanediamine.

25. A process according to claim 24, wherein said solid material recovered according to step (iii) is 100% ZSM-22.

26. A process according to claim 23, wherein the following apply:
(a) the mole ratios of step (i) are as follows:

| | | |
|---|---|---|
| $SiO_2/Al_2O_3$ | = | 90 |
| $H_2O/SiO_2$ | = | 40 |
| $OH^-/SiO_2$ | = | 0 |
| $M^+/SiO_2$ | = | 0.3 |
| $RN/SiO_2$ | = | 0.3; |

(b) RN is pentanediamine;
(c) M is potassium; and
(d) said solid material recovered according to step (iii) is 60% ZSM-22.

27. A process according to claim 23, wherein the following apply:
(a) the mole ratios of step (i) are as follows:

| | | |
|---|---|---|
| $SiO_2/Al_2O_3$ | = | 200 |
| $H_2O/SiO_2$ | = | 40 |
| $OH^-/SiO_2$ | = | 0 |
| $M^+/SiO_2$ | = | 0.6 |
| $RN/SiO_2$ | = | 0.3; |

(b) RN is octanediamine;
(c) M is sodium; and
(d) said solid material recovered according to step (iii) is 100% ZSM-22.

28. A process according to claim 23, wherein the following apply:
(a) the mole ratios of step (i) are as follows:

| | | |
|---|---|---|
| $SiO_2/Al_2O_3$ | = | 90 |
| $H_2O/SiO_2$ | = | 40 |
| $OH^-/SiO_2$ | = | 0.2 |
| $M^+/SiO_2$ | = | 0.3 |
| $RN/SiO_2$ | = | 0.3; |

(b) RN is octanediamine;
(c) M is potassium; and
(d) said solid material recovered according to step (iii) is 100% ZSM-22.

29. A process according to claim 23, wherein the following apply:
(a) the mole ratios of step (i) are as follows:

| | | |
|---|---|---|
| $SiO_2/Al_2O_3$ | = | 90 |
| $H_2O/SiO_2$ | = | 40 |
| $OH^-/SiO_2$ | = | 0.2 |
| $M^+/SiO_2$ | = | 0.3 |
| $RN/SiO_2$ | = | 0.15; |

(b) RN is hexanediamine;
(c) M is potassium; and
(d) said solid material recovered according to step (iii) is ZSM-22 plus a trace of cristobalite.

30. A process according to claim 23, wherein the following apply:
(a) the mole ratios of step (i) are as follows:

| | | |
|---|---|---|
| $SiO_2/Al_2O_3$ | = | 90 |
| $H_2O/SiO_2$ | = | 40 |
| $OH^-/SiO_2$ | = | 0.2 |
| $M^+/SiO_2$ | = | 0.3 |
| $RN/SiO_2$ | = | 0.3; |

(b) RN is hexanediamine;
(c) M is potassium; and
(d) said solid material recovered according to step (iii) is 100% ZSM-22.

31. A process according to claim 23, wherein the following apply:
(a) the mole ratios of step (i) are as follows:

| | | |
|---|---|---|
| $SiO_2/Al_2O_3$ | = | 180 |
| $H_2O/SiO_2$ | = | 40 |
| $OH^-/SiO_2$ | = | 0.1 |
| $M^+/SiO_2$ | = | 0.14 |
| $RN/SiO_2$ | = | 0.3; |

(b) RN is hexanediamine;
(c) M is potassium; and
(d) said solid material recovered according to step (iii) is 100% ZSM-22.

32. A process according to claim 23, wherein the following apply:
(a) the mole ratios of step (i) are as follows:

| | | |
|---|---|---|
| $SiO_2/Al_2O_3$ | = | 60 |
| $H_2O/SiO_2$ | = | 40 |

| | | |
|---|---|---|
| -continued | | |
| $OH^-/SiO_2$ | = | 0.2 |
| $M^+/SiO_2$ | = | 0.33 |
| $RN/SiO_2$ | = | 0.3; |

(b) RN is hexanediamine;
(c) M is potassium; and
(d) said solid material recovered according to step (iii) is 100% ZSM-22.

33. The solid material prepared in accordance with claim 23, having a formula, in terms of moles of oxides, in the as-synthesized form prior to calcination, in the anhydrous state as follows:

$$(0.02 \text{ to } 10)RN:(0 \text{ to } 2)M_{2/n}O:(5 \text{ or less})Al_2O_3:100 SiO_2$$

wherein n is the valence of M.

34. The solid material prepared in accordance with claim 24, having a formula, in terms of moles of oxides, in the as-synthesized form prior to calcination, in the anhydrous state as follows:

$$(0.02 \text{ to } 10)RN:(0 \text{ to } 2)M_{2/n}O:(5 \text{ or less})Al_2O_3:100 SiO_2$$

wherein n is the valence of M.

35. A hydrocarbon conversion process which comprises contacting a hydrocarbon charge under hydrocarbon converting conditions with a crystalline material which is a siliceous porous crystalline ZSM-22 zeolite material having, as synthesized, a calculated composition, expressed in terms of moles of anhydrous oxides, as follows:

$$(x)Q_xO:(y)M_{2/n}:(z)L_2O_3:100SiO_2$$

wherein $Q_2O$ is the oxide form of an organic compound containing an element of Group 5-B of the Periodic Table, said organic compound containing at least one alkyl or aryl group having at least 2 carbon atoms, M is an alkali or alkaline earth metal having a valence n, x=0.01 to 2, y=0 to 2.0, z=0 to 5, and L is aluminum (Al), and having an X-ray diffraction pattern of Table I.

* * * * *

UNITED STATES PATENT AND TRADEMARK OFFICE
CERTIFICATE OF CORRECTION

PATENT NO. : 4,902,406

DATED : February 20, 1990

INVENTOR(S) : Ernest W. Valyocsik

It is certified that error appears in the above-identified patent and that said Letters Patent is hereby corrected as shown below:

COLUMN 17

Claim 6, line 2; change "$SiO_2/Al_2O_3 20$" to --$SiO_2/Al_2O_3 = 20$--.

Signed and Sealed this

Twenty-second Day of December, 1992

Attest:

DOUGLAS B. COMER

*Attesting Officer*    *Acting Commissioner of Patents and Trademarks*